US011945993B2

United States Patent
Deshpande et al.

(10) Patent No.: US 11,945,993 B2
(45) Date of Patent: Apr. 2, 2024

(54) IN-SITU AEROGEL TYPE HYDRAULIC CEMENT COMPOSITION FOR SUBTERRANEAN APPLICATIONS

(71) Applicant: Halliburton Energy Services, Inc., Houston, TX (US)

(72) Inventors: Abhimanyu Pramod Deshpande, Pune (IN); Rajender Salla, Pune (IN); Shoy George Chittattukara, Thrissur (IN); Sandip Prabhakar Patil, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 152 days.

(21) Appl. No.: 17/390,089

(22) Filed: Jul. 30, 2021

(65) Prior Publication Data

US 2023/0036729 A1     Feb. 2, 2023

(51) Int. Cl.
| | |
|---|---|
| *C09K 8/42* | (2006.01) |
| *C04B 7/345* | (2006.01) |
| *C04B 26/10* | (2006.01) |
| *C04B 103/14* | (2006.01) |
| *C09K 8/44* | (2006.01) |
| *C09K 8/473* | (2006.01) |

(52) U.S. Cl.
CPC .............. *C09K 8/426* (2013.01); *C04B 7/345* (2013.01); *C04B 26/10* (2013.01); *C09K 8/44* (2013.01); *C09K 8/473* (2013.01); *C04B 2103/14* (2013.01)

(58) Field of Classification Search
CPC .......... C09K 8/426; C09K 8/44; C09K 8/473; C04B 7/345; C04B 26/10; C04B 2103/14
See application file for complete search history.

(56) References Cited

U.S. PATENT DOCUMENTS

| | | | |
|---|---|---|---|
| 6,330,917 | B2 | 12/2001 | Chatterji et al. |
| 8,828,289 | B2 | 9/2014 | Grun et al. |
| 2008/0311305 | A1 | 12/2008 | Briand et al. |
| 2012/0328377 | A1 | 12/2012 | Brenneis et al. |
| 2017/0009122 | A1* | 1/2017 | Funkhouser ............ C04B 26/14 |
| 2017/0218261 | A1* | 8/2017 | Nguyen ................ E21B 33/138 |
| 2017/0218263 | A1 | 8/2017 | Salla et al. |

OTHER PUBLICATIONS

International Search Report and Written Opinion for Application No. PCT/US2021/044960, dated Apr. 14, 2022.
Stewart, A. et al., "Surface modification of cured cement pastes by silane coupling agents", ACS Applied Materials & Interfaces, 2013, vol. 5, No. 4, pp. 1218-1225, the whole document.

\* cited by examiner

*Primary Examiner* — Crystal J Lee
(74) *Attorney, Agent, or Firm* — Thomas Rooney; C. Tumey Law Group PLLC (57) ABSTRACT

A method may include: introducing a silane based aqueous soluble resin into a wellbore, wherein the silane based aqueous soluble resin comprises a glycidyl alkoxy silane containing resin and an amino alkoxy silane hardener. The silane based aqueous soluble resin may include 3-glycidoxypropyl trimethoxy silane and n-(3-(trimethoxysilyl)propyl) ethylenediamine.

13 Claims, 6 Drawing Sheets

IN-SITU AEROGEL TYPE HYDRAULIC CEMENT COMPOSITION FOR SUBTERRANEAN APPLICATIONS

BACKGROUND

Embodiments relate to resin additives for use in subterranean operations and, more particularly, to silane based aqueous soluble resin systems with improved properties for aqueous cement compositions and methods of using the resin additives in well cementing operations for subterranean formations.

In well operations, such as well construction and remedial cementing, cement compositions are commonly utilized. Cement compositions may be used in primary cementing operations whereby pipe strings, such as casing and liners, are cemented in wellbores. In a typical primary cementing operation, a cement composition may be pumped into an annulus between the exterior surface of the pipe string disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Amongst other things, the cement sheath surrounding the pipe string should function to prevent the migration of fluids in the annulus, as well as protect the pipe string from corrosion. Cement compositions also may be used in remedial cementing methods, such as in squeeze cementing for sealing voids in a pipe string, cement sheath, gravel pack, subterranean formation, and the like. Cement compositions may also be used in surface applications, for example, construction cementing.

Other types of compositions, including non-cementitious settable sealant compositions, such as resin-based sealants, may be used in the primary and/or remedial cementing operations described above. These compositions may be circulated through the well bore for use in any of the primary or remedial cementing operations used in the field. Additionally, resin compositions may be blended with traditional cement compositions to create resin containing cements which may also be used in any type of primary or remedial cementing operation.

Cement compositions experience some loss in compressive strength with increased temperatures, often referred to as strength retrogression. The elevated temperature causes chemical changes in the hydration products of cement which reduce compressive strength and increase permeability, which may lead to loss of zonal isolation. To mitigate strength retrogression, industry practice has been to add additional crystalline silica in amounts of about 10 wt. % to about 40 wt. % of dry blend cement when cementing in formations where the temperature exceeds 230° F. (110° C.).

Another industry practice has been to add resin to the cement to cements to mitigate strength retrogression and increase resiliency of the cement. However, there are some known limitations of resins in oilwell cements. Most resins utilized in oilwell cements are hydrophobic and therefore generally immiscible with aqueous cement slurries. It may be difficult to mix immiscible resin and cement and the non-uniform distribution of rein may not provide resiliency throughout the cement column. High resin loading may exacerbate the mixing problem. Resins also exhibit phase separation in a range of wellbore conditions requiring a new cement design formulation for each wellbore based on wellbore conditions. Resins used in well cementing may only be used in formations where the bottomhole static temperature is lower than the glass transition temperature. Currently used resin systems may only be stable up to about 225° F. If the bottomhole static temperature is greater than the glass transition temperature of the resin, the cured resin may have reduced compressive strength and decreased durability. Sudden temperature changes may also reduce the resiliency of the resin. As such, resin cements may not be able to be successfully placed into some subterranean formations.

BRIEF DESCRIPTION OF THE DRAWINGS

These drawings illustrate certain aspects of some of the embodiments of the present invention, and should not be used to limit or define the invention.

DETAILED DESCRIPTION

Embodiments relate to silane based aqueous soluble resins for use in subterranean operations and, more particularly, to silane based aqueous soluble resins for use in wellbore cements. The soluble resins may include silane based aqueous soluble resins comprise a glycidyl alkoxy silane and an amino alkoxy silane hardener. The silane based aqueous soluble resins may form aerogel-type multi-dimensional cross-linked networks between silane containing compounds in the resin. The multi-dimensional cross-lined silica network may resemble those formed by aerogels prepared by vacuum evaporation of a solvent. The silane based aqueous soluble resins may provide increased resilience to strength retrogression and a decrease in Young's modulus in wellbore cement applications. The disclosed silane based aqueous soluble resins temperature may be used in subterranean formations with higher bottomhole static temperatures such as those with temperatures in excess of 230° F. (110° C.). One of the many potential advantages to these methods and compositions is the silane based aqueous soluble resins may expand the range of subterranean formations in which the resin compositions and/or resin containing cements may be used. Another potential advantage of these methods and compositions is that the silane based aqueous soluble resins may decrease the Young's modulus of a set cement while still having reasonable compressive strengths.

The silane based aqueous soluble resins may comprise a resin and a hardening agent. The silane based aqueous soluble resins may be blended with cement compositions to form resin containing cements. Alternatively, the silane based aqueous soluble resins may be used alone, without blending with cement. The preparation of the resin containing cement may generally include preformulating and preparing the silane based aqueous soluble resin and a cement composition and then blending the silane based aqueous soluble resin and the cement composition together prior to use. The blending may comprise any such blending used in the art, including blending via cement mixers. The silane based aqueous soluble resin and the resin containing cement may thicken to develop compressive strength and/or to form a seal when placed in a void or crack. Accordingly, the silane based aqueous soluble resins and the resin containing cement may function to provide a substantially impermeable barrier to seal off formation fluids and gases and consequently prevent potential fluid and gas migration into the annulus or the interior of the casing.

Suitable resins for use in the silane based aqueous soluble resins may include glycidyl alkoxy silanes such as 3-glycidoxypropyl trimethoxy silane (GPTMS) and substituted derivatives thereof. Some suitable resins may include, but are not limited to, 3-glycidoxypropyl trimethoxy silane, (3-glycidoxypropyl)triethoxysilane, (3-glycidoxypropyl)methyldiethoxysilane, (3-glycidoxypropyl)methyldimethoxysilane, (3-glycidoxypropyl)dimethylethoxysilane (3-glycidoxypropyl)dimethylmethoxysilane, and combinations thereof. Generally, the resin may be included in silane based aqueous soluble resins in an amount in the range of about 5% to about 99% by volume of the silane based aqueous soluble resins. Alternatively, the resin may be included in the silane based aqueous soluble resins in an amount of about 5% to about 40% by volume, about 40% to about 60% by volume, or about 60% to about 99% by volume of silane based aqueous soluble resins.

Suitable hardening agents for use in the silane based aqueous soluble resins may include amino alkoxy silanes which may include, but are not limited to, n-(3-(trimethoxysilyl)propyl)ethylenediamine, 3-aminopropyltriethoxysilane, 3-aminopropyltrimethoxysilane, 4-aminobutyltriethoxysilane, 3-(triethoxysilyl)propyl ethylenediamine, and combinations thereof. Generally, the hardening agent may be included in silane based aqueous soluble resins in an amount in the range of about 1% to about 99% by volume of the silane based aqueous soluble resins. Alternatively, the hardening agent may be included in the silane based aqueous soluble resins in an amount of about 1% to about 40% by volume, about 40% to about 60% by volume, or about 60% to about 99% by volume of silane based aqueous soluble resins. The hardening agent may be included in the resin compositions in an amount sufficient to at least partially harden the resin compositions. The amount of hardening agent may be selected to impart a desired elasticity or compressibility. Without limitation, generally, the lower the amount of hardening agent present in the resin compositions, the greater the elasticity or compressibility will be. The hardening agent may comprise a mixture of hardening agents selected to impart particular qualities to the resin compositions.

It is believed that the silane based aqueous soluble resins may react with silicates present in the cement to form silica-oxygen bonds between the resin, the hardening agent, or both to the silicates. The resin and hardening agent may also react to form a cured resin, wherein the cured resin is chemically bonded to the silicates in a cross-linked multidimensional network. As will be shown in the Examples below, the silane based aqueous soluble resins have a decreased Young's modulus as compared to a cement which does not contain the silane based aqueous soluble resins while still retaining reasonable compressive strength. It is believed that the silane based aqueous soluble resins may covalently bond with other resins, such as phenol-based resins and epoxide-based resins included in the resin containing cement. The covalent bonding of the silane based aqueous soluble resins may create a permanent enhancement that should not degrade over time, as may happen with types of resin-enhancers that rely on weak interactions such as electrostatic interactions or hydrogen bonding. Thus, the silane based aqueous soluble may be used as a resin-enhancer, as the covalent bonds formed with the resin network result in a permanent increase in glass transition temperature.

The silane based aqueous soluble resins, if used alone, and the resin containing cement generally should have a density suitable for a particular application. It is believed that the density of the silane based aqueous soluble resins and the resin containing cement may be adjusted to achieve the proper density hierarchy for placement of the silane based aqueous soluble resins and the resin containing cement. As an example, the silane based aqueous soluble resins and the resin containing cement may have a density in the range of from about 5 pounds per gallon ("ppg") to about 20 ppg. In a further example, the silane based aqueous soluble resins and the resin containing cement may have a density in the range of about 8 ppg to about 14 ppg. In yet other examples, the silane based aqueous soluble resins and the resin containing cements may have a density in the range of about 10 ppg to about 12 ppg. Moreover, filler particles may be chosen which modify the mechanical properties of the set resin compositions and the resin containing cement or the fluid properties of the liquid (uncured) resin compositions. Examples of suitable filler particles may include, but are not limited to, aluminum oxide, awaruite, barium carbonate, barium oxide, barite, calcium carbonate, calcium oxide, cenospheres, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese (IV) oxide, manganese oxide, manganese tetraoxide, manganese (II) oxide, manganese (III) oxide, molybdenum (IV) oxide, molybdenum oxide, molybdenum trioxide, Portland cement, pumice, pyrite, spherelite, silica, silver, tenorite, titania, titanium (II) oxide, titanium (III) oxide, titanium (IV) dioxide, zirconium oxide, zirconium silicate, zinc oxide, cement-kiln dust, unexpanded and expanded perlite, attapulgite, bentonite, zeolite, elastomers, sand, micronized polymers, waxes, polymer fibers, inorganic fibers and any combination thereof. It should be noted that the foregoing list encompasses all crystal forms of any material.

It is believed that resin compositions and resin containing cements placed in subterranean formations with bottomhole static temperatures greater than the glass transition temperature of the resin may have reduced compressive strength and decreased durability. This effect may limit the use of resin compositions and resin containing cements in high-temperature applications, such as those applications where temperatures exceed 230° F. Advantageously, the disclosed silane based aqueous soluble resins have glass transition temperatures in excess of 230° F., allowing the use of the silane based aqueous soluble resins in subterranean formations with bottomhole static temperatures that were previously too high for use of resin compositions. Further, the silane based aqueous soluble resins may covalently bond with the other resin components in the resin systems such that the increase in glass transition temperature is permanent. Moreover, the use of silane based aqueous soluble resins should not significantly shorten the thickening times of the resin compositions as compared to phenol-based epoxy resins or other resins currently in use.

Resin containing cements may include the silane based aqueous soluble resins as well as additional resins. When additional resins are used alongside the silane based aqueous soluble resins, the silane based aqueous soluble resins may act as a resin-enhancer to increase the overall glass transition temperature of the additional resin. Some additional resins may include, but are not limited to an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and a hybrid and copolymer thereof, a polyurethane resin and a hybrid and copolymer thereof, an acrylate resin, and any combination thereof. The resins may be paired with a suitable hardening agent which may include, but are not limited to an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and any combination thereof.

When a resin composition includes the silane based aqueous soluble resins and additional resins as described above, the silane based aqueous soluble resins may be included in the resin compositions in an amount in the range of about 1% to about 99% by volume of the resin composition. For example, the silane based aqueous soluble resins may be included in the resin compositions in an amount of about 10% to about 20% by volume of the resin composition, about 20% to about 50% by volume, about 50% by volume to about 70% by volume, or about 50% to about 99% by volume. Factors that may affect this determination include the type of resin and potential hardening agent desired for a particular application, the glass transition temperature of the resin, and the type of the silane based aqueous soluble resins, for example. In examples with a resin containing cement, the silane based aqueous soluble resins and any additional resins described above may be included in the resin containing cement in an amount from of about 10% to about 90% by volume of the resin containing cement composition. Alternatively, the resins may be included in an amount from of about 5% to about 20% by volume, about 20% to about 40% by volume, about 40% by volume to about 60% by volume, about 60% by volume to about 80% by volume, about 80% to about 90% by volume, or any ranges therebetween.

As discussed above and without limitation, the silane based aqueous soluble resins may increase the glass transition temperature of a resin. The amount of the increase in the glass transition temperature is due to a variety of factors and can vary greatly because of these factors. Some of these factors include the type of resin, the glass transition temperature of the base resin, the number of alkoxide and epoxide groups in the silane based aqueous soluble resins, the amount of the silane based aqueous soluble resins used, etc. The increase in glass transition temperature will determine the range of subterranean formations in which the resin compositions and/or resin containing cements comprising the silane based aqueous soluble resins may be used. Although the silane based aqueous soluble resins may increase the glass transition temperature of the resin in the resin compositions and the resin containing cements, as a general rule, the increased glass transition temperature should still be greater than the bottomhole static temperature of the subterranean formation in order to prevent reduced compressive strength and durability.

Optionally, a diluent may be added to the silane based aqueous soluble resins or resin compositions containing the silane based aqueous soluble resins to reduce the viscosity of the resin compositions for ease of handling, mixing, and transferring. Generally, any diluent that is compatible with the resin and that achieves the desired viscosity effect may be suitable for use in the resin compositions. Some diluents may be reactive, in that they are incorporated into the resin. Diluents that are reactive may comprise amine or epoxide functional groups. Suitable diluents may include, but are not limited to, butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, limonene, fatty acid methyl esters, or any combinations thereof. Selection of an appropriate diluent may be dependent on the resin composition and/or cement composition chosen. In some embodiments, the amount of the diluent used in the resin composition may be in the range of about 0.1% to about 30% by weight of the resin composition. Optionally, the resin composition may be heated to reduce its viscosity, in place of, or in addition to, using a diluent.

The resin compositions may be prepared in accordance with any suitable technique. As an example, the desired quantity of resin may be introduced into a mixer (e.g., a batch mixer) prior to or followed by the addition of any optional hardening agent and/or diluent. Additional additives, if any, may be added to the mixer as desired prior to, or after, the addition of the resin to the mixer. This mixture may be agitated for a sufficient period of time. By way of example, pumps may be used for delivery of the resin composition into the wellbore.

The resin compositions may be preformulated, prepared, and then blended with cement compositions comprising water and any of a variety of hydraulic cements to create resin containing cements. Suitable examples of hydraulic cements include those that comprise calcium, aluminum, silicon, oxygen and/or sulfur, which set and harden by reaction with water. Examples of such hydraulic cements, include, but are not limited to, Portland cements, pozzolana cements, gypsum cements, high-alumina-content cements, slag cements, silica cements, and combinations thereof. Suitable Portland cements may be classified as Classes A, C, H, or G cements according to the American Petroleum Institute, API Specification for Materials and Testing for Well Cements, API Specification 10, Fifth Ed., Jul. 1, 1990. In addition, the hydraulic cement may include cements classified as ASTM Type I, II, or III.

Water used in create resin containing cements may include, for example, freshwater, saltwater (e.g., water containing one or more salts dissolved therein), brine (e.g., saturated saltwater produced from subterranean formations), seawater, or any combination thereof. Generally, the water may be from any source, provided that the water does not contain an excess of compounds that may undesirably affect other components in the resin containing cement. The water may be included in an amount sufficient to form a pumpable slurry. The water may be included in the cement compositions in an amount in the range of from about 20% to about 400% by weight of the hydraulic cement ("bwoc") and, alternatively, in an amount in a range of from about 40% to about 150% bwoc. By way of further example, the water may be present in an amount ranging between any of and/or including any of about 40%, about 50%, about 60%, about 70%, about 80%, about 90%, about 100%, about 110%, about 120%, about 130%, about 140%, about 150%, about 160%, about 170%, about 180%, about 190%, or about 200% bwoc. One of ordinary skill in the art, with the benefit of this disclosure, should recognize the appropriate amount of water to include for a chosen application.

A wide variety of additional additives may be included in the resin compositions and/or the resin containing cements. Examples of such additives include, but are not limited to: supplementary settable or cementitious materials, weighting agents, viscosifying agents (e.g., clays, hydratable polymers, diutan, xanthan gum, and cellulose derivatives or any combination thereof), fluid loss control additives, lost circulation materials, filtration control additives, dispersants, foaming additives, defoamers, corrosion inhibitors, scale inhibitors, formation conditioning agents, and water-wetting surfactants. Water-wetting surfactants may be used to aid in removal of oil from surfaces in the wellbore (e.g., the casing) to enhance cement and resin bonding. Specific examples of these, and other, additives include: organic polymers, biopolymers, latex, ground rubber, surfactants, crystalline silica, amorphous silica, silica flour, fumed silica, nano-clays (e.g., clays having at least one dimension less than 100 nm), salts, fibers, hydratable clays, microspheres, rice husk ash, micro-fine cement (e.g., cement having an average particle size of from about 5 microns to about 10 microns), metakaolin, zeolite, shale, pumice, perlite, barite, slag, lime (e.g., hydrated lime), gypsum, any combinations thereof, and the like.

Optionally, cement foaming additives may be included in the resin containing cements, for example, to facilitate foaming and/or stabilize the resultant foam formed therewith. The foaming additive may include a surfactant or combination of surfactants that reduce the surface tension of the water. As will be appreciated by those of ordinary skill in the art, the foaming additives may be used in conjunction with a gas to produce a foamed resin containing cement. By way of example, the foaming agent may comprise an anionic, nonionic, amphoteric (including zwitterionic surfactants), cationic surfactant, or mixtures thereof. Examples of suitable foaming additives include, but are not limited to: betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Inc.

Cement strength-retrogression additives may be included in the resin containing cements, for example, to further prevent the retrogression of strength after the resin containing cements have been allowed to develop compressive strength. These additives may allow the resin containing cements to form as intended, preventing cracks and premature failure. Examples of suitable strength-retrogression additives may include, but are not limited to, amorphous silica, coarse grain crystalline silica, fine grain crystalline silica, or a combination thereof.

Set accelerators for cement may be included in the resin containing cements, for example, to increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gypsum-hemihydrate, sodium aluminate, sodium carbonate, sodium chloride, sodium silicate, sodium sulfate, ferric chloride, or a combination thereof. Set accelerators for resin may be included in the resin compositions, for example, to increase the rate of setting reactions. Control of setting time may allow for the ability to adjust to wellbore conditions or customize set times for individual jobs. Examples of suitable set accelerators may include, but are not limited to tertiary amines (including 2,4,6-tris(dimethylaminomethyl)phenol, benzyl dimethylamine, and 1,4-diazabicyclo[2.2.2]octane), imidazole and its derivatives (e.g., 2-ethyl,-4-methylimidazole, 2-methylimidazole, 1-(2-cyanoethyl)-2-ethyl-4-methylimidazole), Lewis acid catalysts (e.g. aluminum chloride, boron trifluoride, boron trifluoride ether complexes, boron trifluoride alcohol complexes, boron trifluoride amine complexes), and metal salts (e.g. $ZnCl_2$, Zn (II) acetate, $FeCl_3$) or a combination thereof.

Set retarders for cement may be included in the resin containing cements, for example, to increase the thickening time. Examples of suitable set retarders include, but are not limited to, ammonium, alkali metals, alkaline earth metals, borax, metal salts of calcium lignosulfonate, carboxymethyl hydroxyethyl cellulose, sulfoalkylated lignins, hydroxycarboxy acids, copolymers of 2-acrylamido-2-methylpropane sulfonic acid salt and acrylic acid or maleic acid, saturated salt, or a combination thereof. One example of a suitable sulfoalkylated lignin comprises a sulfomethylated lignin.

Gas-generating additives for cement may be included in the resin containing cements to release gas at a predetermined time, which may be beneficial to prevent gas migration from the formation through the resin containing cements before they harden. The generated gas may combine with or inhibit the permeation of the resin containing cements by formation gas. Examples of suitable gas-generating additives include, but are not limited to, metal particles (e.g., aluminum powder) that react with an alkaline solution to generate a gas.

Mechanical-property-enhancing additives for cement may be included in the resin containing cements, for example, to ensure adequate compressive strength and long-term structural integrity. These properties can be affected by the strains, stresses, temperature, pressure, and impact effects from a subterranean environment. Examples of mechanical-property-enhancing additives include, but are not limited to, carbon fibers, glass fibers, metal fibers, mineral fibers, silica fibers, polymeric elastomers, latexes, and combinations thereof.

Lost-circulation materials may be included in the resin compositions and/or the resin containing cements, for example, to help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, melamine laminates (e.g., Formica® laminate), comcobs, cotton hulls, and combinations thereof. Fluid-loss-control additives for cement may be included in the resin containing cements, for example, to decrease the volume of fluid that is lost to the subterranean formation. Properties of the resin containing cements may be significantly influenced by their water content. The loss of fluid can subject the resin containing cements compositions to degradation or complete failure of design properties. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers comprising a backbone of lignin or lignite and pendant groups comprising at least one member selected from the group consisting of 2-acrylamido-2-methylpropanesulfonic acid, acrylonitrile, and N,N-dimethylacrylamide.

Cement defoaming additives may be included in the resin containing cements, for example, to reduce the tendency of the resin containing cements to foam during mixing and pumping of the resin containing cements. Examples of suitable defoaming additives include, but are not limited to, polyol silicone compounds. Suitable defoaming additives are available from Halliburton Energy Services, Inc., under the product name D-AIR™ defoamers.

Thixotropic additives may be included in the resin compositions and/or the resin containing cements, for example, to provide a resin composition and/or resin containing cement that can be pumpable as a thin or low viscosity fluid, but when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The resin compositions and/or the resin containing cements may be used in a variety of subterranean operations, including primary and remedial cementing. In some embodiments, a resin containing cement composition may be provided that comprises a silane based aqueous soluble resin and cement. The resin compositions and/or the resin containing cements may be introduced into an annular space between a conduit located in a wellbore and the walls of a wellbore (and/or a larger conduit in the wellbore), wherein the wellbore penetrates the subterranean formation. The resin compositions and/or the resin containing cements may be allowed to set in the annular space to form an annular sheath of hardened resin and/or hardened resin-cement. The resin compositions and/or the resin containing cements may form a barrier that prevents the migration of fluids in the wellbore. The resin compositions and/or the resin containing cements may also, for example, support the conduit in the wellbore.

In remedial cementing, for example, the resin compositions and/or the resin containing cements may be used, for example, in squeeze-cementing operations. By way of example, the resin compositions and/or the resin containing cements may be placed in a wellbore to plug a void or crack in the formation, in a gravel pack, in the conduit, in the cement sheath, and/or in a microannulus between the cement sheath and the conduit.

Another example method comprises sealing a portion of a gravel pack or a portion of a subterranean formation. The method may comprise providing a resin composition and/or a resin containing cement; introducing the resin composition and/or the resin containing cement into the portion of the gravel pack or the portion of the subterranean formation; and allowing the resin composition to form a hardened mass in said portion. The portions of the subterranean formation may include permeable portions of the formation, fractures (natural or otherwise) in the formation, and other portions of the formation that may allow the undesired flow of fluid into, or from, the wellbore. The portions of the gravel pack include those portions of the gravel pack, wherein it is desired to prevent the undesired flow of fluids into, or from, the wellbore. Among other things, this method may allow the sealing of the portion of the gravel pack to prevent the undesired flow of fluids without requiring the gravel pack's removal.

Another example method may comprise sealing voids located in a pipe string (e.g., casing, expandable casings, liners, etc.) or in a cement sheath. Generally, the pipe string will be disposed in a wellbore, and the cement sheath may be located in the annulus between the pipe string disposed in the well bore and a wall of the well bore. An example of such a method may comprise providing a resin composition and/or a resin containing cement; introducing the resin composition and/or the resin containing cement into the void; and allowing the resin composition and/or the resin containing cement to set to form a hardened mass in the void.

When sealing a void in a pipe string, some methods may comprise locating the void in the pipe string; and isolating the void by defining a space within the pipe string in communication with the void; wherein the resin composition and/or the resin containing cement may be introduced into the void from the space. The void may be isolated using any suitable technique and/or apparatus, including bridge plugs, packers, and the like. The void in the pipe string may be located using any suitable technique.

When sealing a void in the cement sheath, some methods may comprise locating the void in the cement sheath; producing a perforation in the pipe string that intersects the void; and isolating the void by defining a space within the pipe string in communication with the void via the perforation, wherein the resin composition and/or the resin containing cement is introduced into the void via the perforation. The void in the pipe string may be located using any suitable technique. The perforation may be created in the pipe string using any suitable technique, for example, perforating guns. The void may be isolated using any suitable technique and/or apparatus, including bridge plugs, packers, and the like.

Another example method may comprise consolidating a formation that is weak or loose. This may comprise providing a resin composition and/or a resin containing cement and pumping the resin composition and/or the resin containing cement into the weak or loose parts of the formation. Alternatively, the resin composition and/or the resin containing cement may be pumped into a section adjacent to the weak or loose part of the formation and be allowed to flow into the weak or loose part of the formation. The resin composition and/or the resin containing cement may then be allowed to set.

Figure 1:
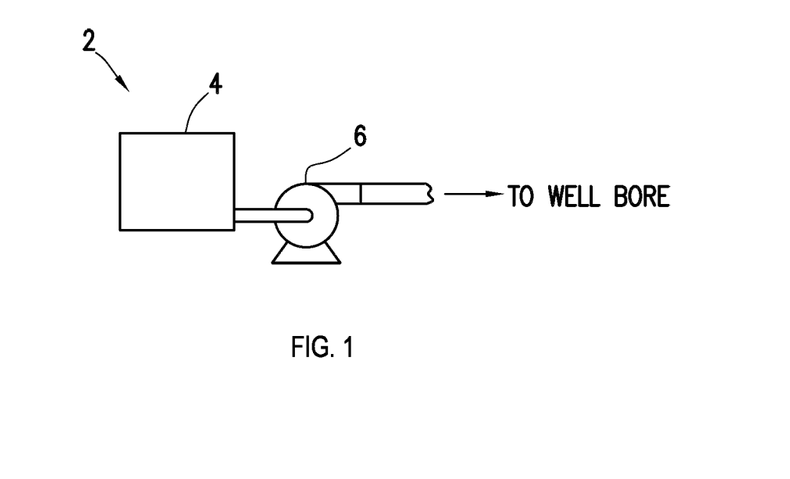
FIG. 1 is a schematic illustration of an example system for the preparation and delivery of a resin composition and/or a resin containing cement into a wellbore.

Example methods of using the resin compositions or the resin containing cements will now be described in more detail with reference to FIGS. 1-6. Any of the previous embodiments of the resin compositions and the resin containing cements may apply in the context of FIGS. 1-6. Referring now to FIG. 1, the preparation of a resin composition or a resin containing cement in accordance with example embodiments will now be described. FIG. 1 illustrates a system 2 for the preparation of either a resin composition or a resin containing cement and subsequent delivery of the resin composition or the resin containing cement to a wellbore in accordance with certain embodiments. As shown, the resin composition or the resin containing cement may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. If a resin containing cement is to be used, a resin composition and a cement composition are to be preformulated and prepared. The individual resin composition and cement composition may be mixed in mixing equipment 4 or in other mixing equipment. Once individually prepared, the resin composition and cement composition may be blended together in mixing equipment 4 before being pumped via pumping equipment 6.

Figure 2:
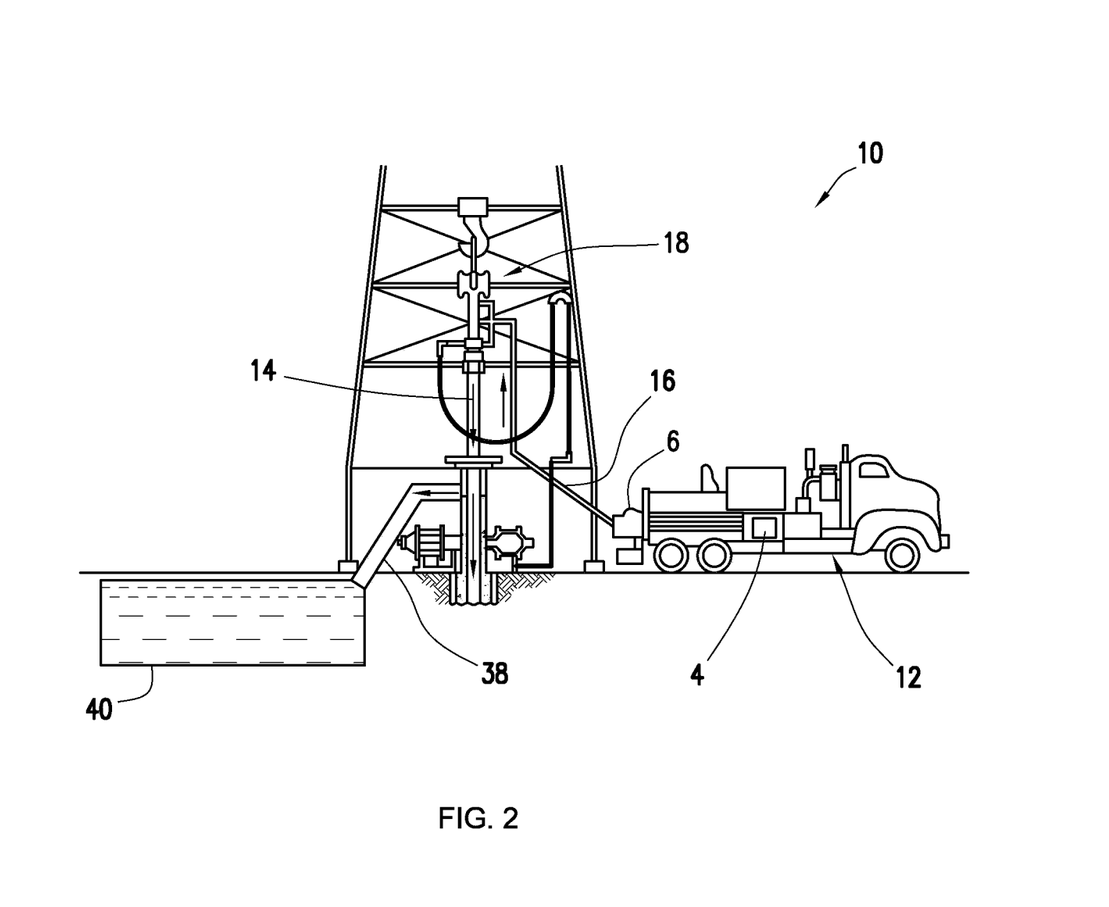
FIG. 2 is a schematic illustration of example surface equipment that may be used in the placement of a resin composition and/or a resin containing cement into a wellbore.

An example primary cementing technique using a resin composition will now be described with reference to FIGS. 2 and 3. FIG. 2 illustrates surface equipment 10 that may be used in the placement of a resin composition or a resin containing cement in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. Cementing unit 12, or multiple cementing units 12, may pump a resin composition 14, or alternatively a or a resin containing cement, (as shown in FIG. 3) through a feed pipe 16 and to a cementing head 18 which conveys resin composition 14 downhole.

Figure 3:
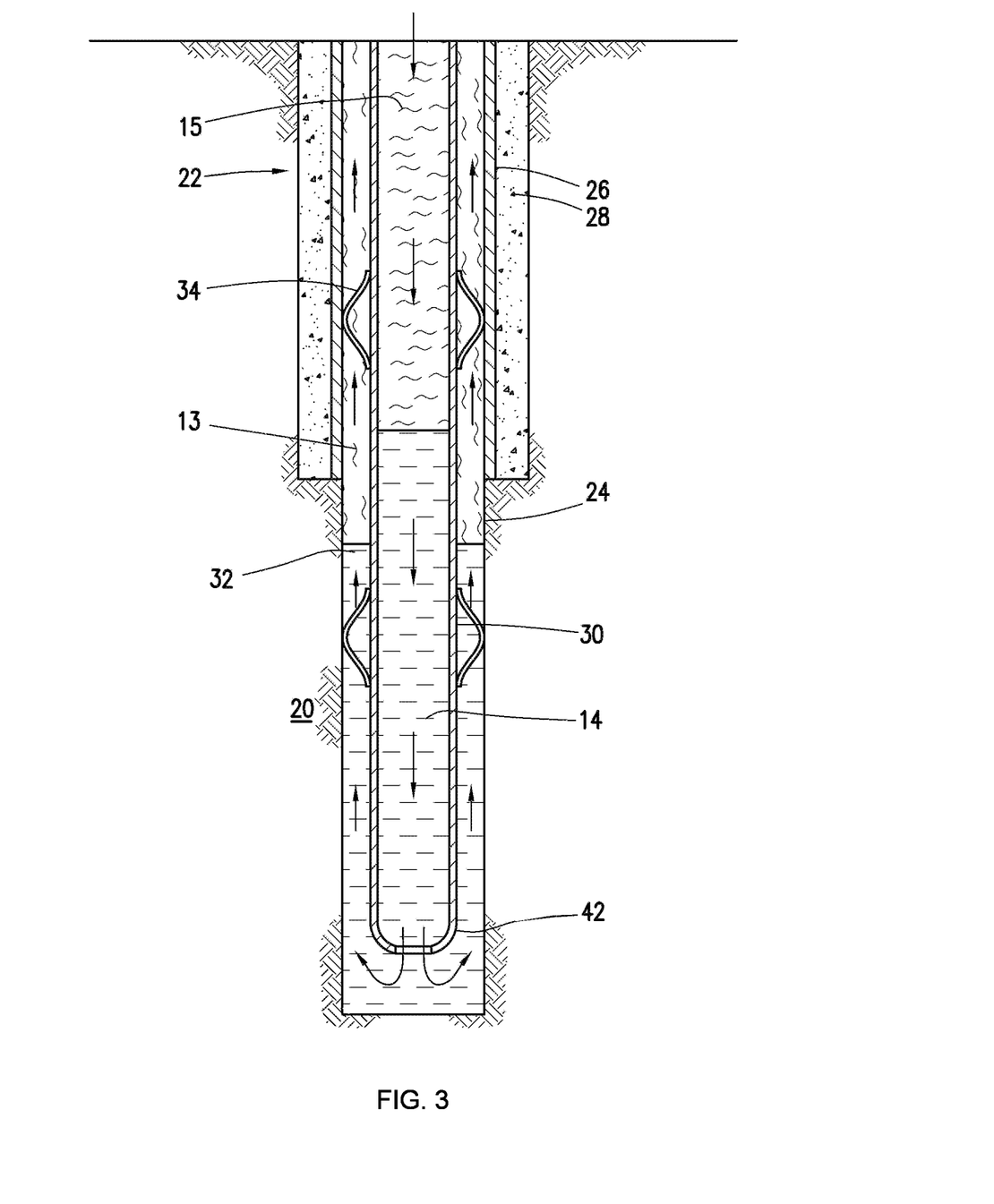
FIG. 3 is a schematic illustration of an example in which a resin composition and/or a resin containing cement is used in a primary cementing application.

FIG. 3 generally depicts the placement of resin composition 14 into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented in the wellbore 22 by a cement sheath 28. In alternative embodiments, surface casing 26 may be secured in the wellbore 22 by a hardened resin or hardened resin containing cement sheath in place of cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, a first spacer fluid 13 may be pumped down the interior of the casing 30. The first spacer fluid 13 may be allowed to flow down the interior of the casing 30 through the casing shoe 42 at the bottom of the casing 30 and up around the casing 30 into the wellbore annulus 32. After the first spacer fluid 13 has been pumped into the casing 30, resin composition 14 may be pumped into the casing 30. In a manner similar to pumping the first spacer fluid 13, the resin composition 14 may be allowed to flow down the interior of the casing 30 through the casing shoe 42 at the bottom of the casing 30 and up around the casing 30 into the wellbore annulus 32. After the resin composition 14 has been pumped into the casing 30, a second spacer fluid 15 may be pumped into casing 30 and allowed to flow down the interior of the casing 30. The first spacer fluid 13 and the second spacer fluid 15 may be used to separate the resin composition 14 from fluids introduced into the wellbore 22 either in front of or behind the resin composition 14. Once the resin composition 14 has been placed into the desired position in the wellbore annulus 32, the resin composition 14 may be allowed to set in the wellbore annulus 32, for example, to form a hardened resin sheath that supports and positions the casing 30 in the wellbore 22. Alternatively, one or no spacer fluids may be used, and resin composition 14 may not need to be separated from other fluids introduced previously or subsequently into wellbore 22. While not illustrated, other techniques may also be utilized for introduction of the resin composition 14. By way of example, reverse circulation techniques may be used that include introducing the resin composition 14 into the subterranean formation 20 by way of the wellbore annulus 32 instead of through the casing 30. These techniques may also utilize a first spacer fluid 13 and a second spacer fluid 15, or they may utilize one or none spacer fluids. As it is introduced, the resin composition 14 may displace the first spacer fluid 13. At least a portion of the first spacer fluid 13 may exit the wellbore annulus 32 via a flow line 38 and be deposited, for example, in one or more retention pits 40 (e.g., a mud pit), as shown on FIG. 2.

Figure 4:
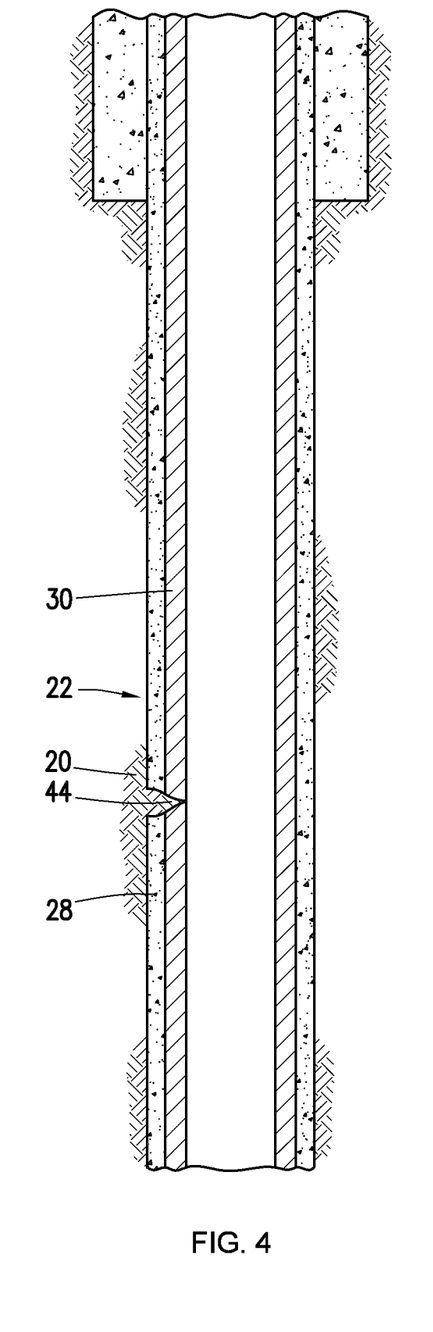
FIG. 4 is a schematic illustration showing the presence of a small perforation in a casing and cement sheath in a wellbore.
Figure 5:
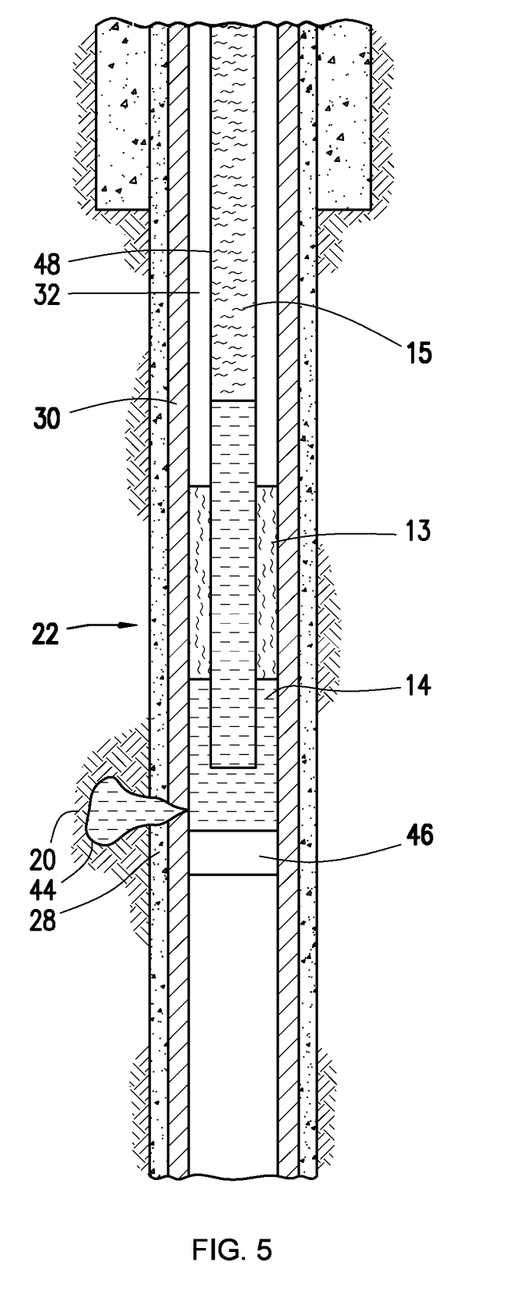
FIG. 5 is a schematic illustration of an example in which a resin composition and/or a resin containing cement is used in a remedial cementing application.
Figure 6:
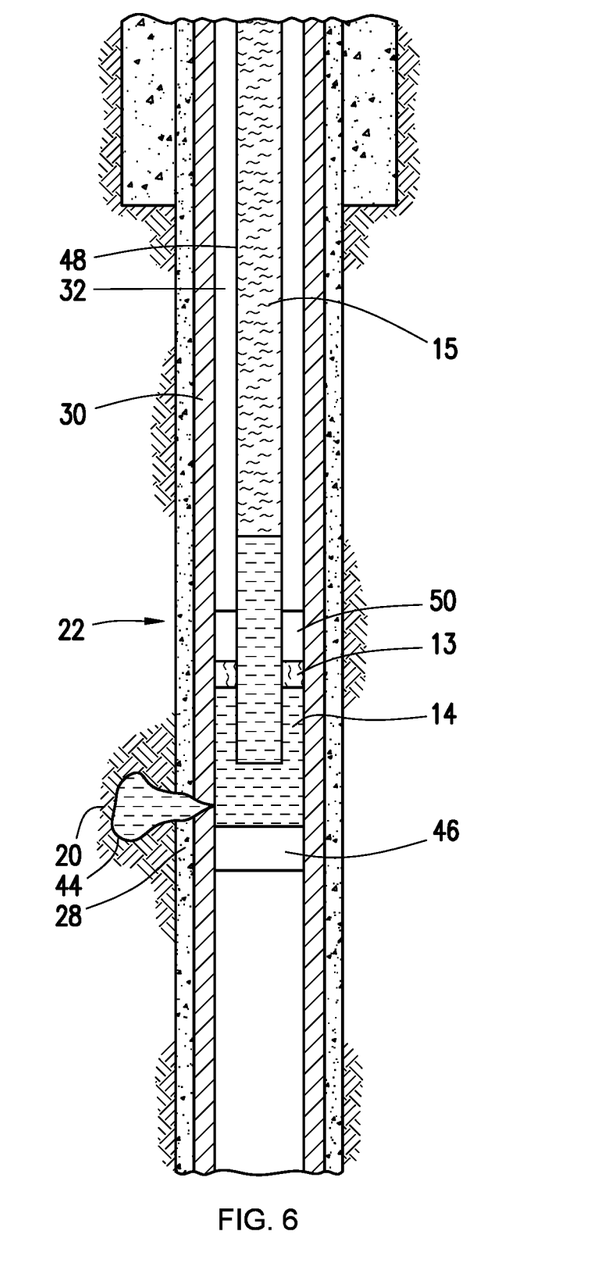
FIG. 6 is a schematic illustration of another example in which a resin composition and/or a resin containing cement is used in a remedial cementing application.

FIGS. 4-6 illustrate methods of remedial or secondary cementing. Turning now to FIG. 4, there is shown a partial cross-section of a conventional producing wellbore 22 that has a primary cemented casing 30. The cement sheath 28 around the casing 30 may have defects potentially caused by a variety of issues, such as improper curing of the cement sheath 28 while it was being formed. Alternatively, the primary cementing may have been successful, but due to adverse temperatures and pressures within the subterranean formation 20, the casing 30 and/or the cement sheath 28 surrounding the casing 30 may form cracks or other types of small perforations 44. The small perforations 44 may be problematic since they may facilitate the introduction of undesirable fluids into the casing 30. As shown in FIG. 4, a small perforation 44 has formed in the cement sheath 28 and the casing 30, potentially allowing the introduction of undesirable fluids into the interior of the casing 30.

Referring now to FIG. 5, a small perforation 44 may be filled or plugged by a resin composition 14 or a resin containing cement. A plug 46 (the plug 46 may be any type of plug, e.g., bridge plug, etc.) may be initially placed adjacent and below the small perforation 44, to form a barrier to prevent resin composition 14 from flowing down the wellbore 22 and therefore allow resin composition 14 of the present disclosure to fill the small perforations 44 in the casing 30 and cement sheath 28. As shown in FIG. 5, tubing 48 (e.g., coiled tubing, drill pipe, etc.) may be lowered into wellbore 22. A first spacer fluid 13 may be pumped into the wellbore 22 via the tubing 48 and allowed to flow down the interior of the tubing 48 and into the blocked section of the wellbore 22 created by the plug 46. A portion of the first spacer fluid 13 may then flow through the small perforation 44 while another portion may reside in the annulus 32. After pumping the first spacer fluid 13 through the tubing 48, the resin composition 14 may be pumped through the tubing 48. The resin composition 14 may be pumped down the interior of the tubing 48 and into the blocked section of the wellbore 22 created by the plug 46. A portion of the resin composition 14 may then flow through the small perforation 44 while another portion may reside in the annulus 32. The resin composition 14 may be allowed to set in the small perforation 44 and in a portion of the wellbore annulus 32, for example, to form a hardened resin (or alternatively a hardened resin containing cement) that seals small perforation 44 to prevent the migration of undesirable fluids into the interior of the casing 30. After the resin composition 14 has been pumped into the tubing 48, a second spacer fluid 15 may be pumped into the tubing 48 and allowed to flow down the interior of the tubing 48 into the blocked section of the wellbore 22 created by the plug 46 and up around the tubing 48 into the wellbore annulus 32. Alternatively, one or no spacer fluids may be used, and resin composition 14 may not need to be separated from other fluids introduced previously or subsequently into wellbore 22. The tubing 48 may then be removed. The plug 46 may also be removed. In alternative embodiments, plug 46 may remain in the wellbore 22 and be drilled through. After tubing 48 is removed, the portion of the hardened resin composition 14 remaining in the wellbore 22 (i.e., the portion not in the small perforation 44) may then be drilled through.

FIG. 6 describes another embodiment of filling a small perforation 44 with a resin composition 14. A plug 46 (the plug 46 may be any type of plug, e.g., bridge plug, etc.) may be initially placed adjacent and below the small perforation 44, to form a barrier that may allow pressurized pumping of a resin composition 14 of the present disclosure to fill any small perforations 44 in the casing 30 and cement sheath 28. As shown in FIG. 6, tubing 48 (e.g., coiled tubing, drill pipe, etc.) may be lowered into wellbore 22. Tubing 48 may be attached to a retainer 50 or may be inserted into a retainer 50 already placed into the wellbore 22. Retainer 50 may allow for the pressurized pumping of the resin composition 14 into any small perforations 44. Retainer 50 must be placed adjacent to and above the small perforations 44 to be filled by resin composition 14. Retainer 50 may be any type of retainer, for example, a cement retainer. After plug 46, tubing 48, and retainer 50 are placed, a first spacer fluid 13 may be pumped into the wellbore 22 via the tubing 48 and allowed to flow down the interior of the tubing 48 and into the blocked section of the wellbore 22 created by the plug 46. A portion of the first spacer fluid 13 may then flow through the small perforation 44. After pumping the first spacer fluid 13 through the tubing 48, the resin composition 14 may be pumped through the tubing 48. The resin composition 14 may be pumped down the interior of the tubing 48 and into the blocked section of the wellbore 22 created by the plug 46. A portion of the resin composition 14 may then flow through the small perforation 44 while another portion may reside in the space formed between the plug 46 and retainer 50. The resin composition 14 may be allowed to set in the small perforation 44 and in the space formed between the plug 46 and retainer 50. The resin composition 14 may then harden to form a hardened resin (or alternatively a hardened resin containing cement) that seals small perforation 44 to prevent the migration of undesirable fluids into the interior of the casing 30. After the resin composition 14 has been pumped into the tubing 48, a second spacer fluid 15 may be pumped into the tubing 48 and allowed to flow down the interior of the tubing 48 into the blocked section of the wellbore 22 created by the plug 46 and into the space formed between the plug 46 and retainer 50. Alternatively, one or no spacer fluids may be used, and resin composition 14 may not need to be separated from other fluids introduced previously or subsequently into wellbore 22. The tubing 48 may then be removed. The plug 46 may also be removed. In alternative embodiments, plug 46 may remain in the wellbore 22 and be drilled through. Retainer 50 may also be removed. Conversely, in alternative embodiments, retainer 50 may be drilled through. After tubing 48 is removed, the portion of the hardened resin composition 14 remaining in the wellbore 22 (i.e., the portion not in the small perforation 44) may then be drilled through.

The exemplary resin compositions and resin containing cements disclosed herein may directly or indirectly affect one or more components or pieces of equipment associated with the preparation, delivery, recapture, recycling, reuse, and/or disposal of the resin compositions and resin containing cements. For example, the resin compositions and resin containing cements may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary resin compositions and resin containing cements containing the same. The disclosed resin compositions and resin containing cements may also directly or indirectly affect any transport or delivery equipment used to convey the resin compositions and resin containing cements to a well site or downhole such as, for example, any transport vessels, conduits, pipelines, trucks, tubulars, and/or pipes used to compositionally move the resin compositions and resin containing cements from one location to another, any pumps, compressors, or motors (e.g., topside or downhole) used to drive the resin compositions and resin containing cements, or fluids containing the same, into motion, any valves or related joints used to regulate the pressure or flow rate of the resin compositions and resin containing cements (or fluids containing the same), and any sensors (i.e., pressure and temperature), gauges, and/or combinations thereof, and the like. The disclosed resin compositions and resin containing cements may also directly or indirectly affect the various downhole equipment and tools that may come into contact with the resin compositions and resin containing cements such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

A first cement slurry was prepared according to Table 1. A 90% volume of the first cement slurry was mixed with 10% volume of GPTMS and TMSPED. A second latex cement slurry was prepared according to Table 2.

TABLE 1

| Material | |
|---|---|
| Water | 32.56% bwc |
| Class H Cement | 100.00% bwc |
| Free water control additive | 0.05% bwc |
| Defoamer | 0.02 gal/sk |

TABLE 2

| Material | |
|---|---|
| Water | 26.54% bwc |
| Class H Cement | 100.00% bwc |
| Suspension Aid | 35.00% bwc |
| Retarder | 0.4% bwc |
| Friction Reducer | 0.02 gal/sk |
| Latex | 2.00 gal/sk |
| Defoamer | 0.02 gal/sk |

Three samples of each of slurry 1 and slurry 2 were cured in autoclave for 7 days at 270° F. (132.2° C.). The cured samples were tested for crush compressive strength and Young's Modulus. The average result of each of the three samples are shown in Table 3. It was observed that the Young's Modulus of slurry 1 was significantly lower than slurry 2 while still maintaining compressive strength.

TABLE 3

| Slurry Design | Young's Modulus (Mpsi) | Crush Strength (psi) |
|---|---|---|
| 1 | 1.11 | 2400 |
| 2 | 1.72 | 2800 |

Example 2

Figure 7:
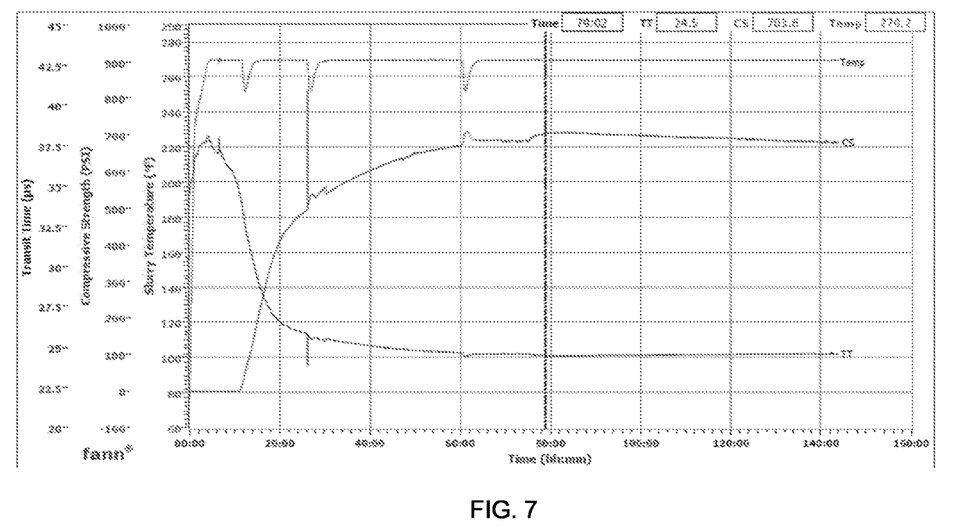
FIG. 7 is a graph of an ultrasonic cement analysis test of a resin cement slurry.
Figure 8:
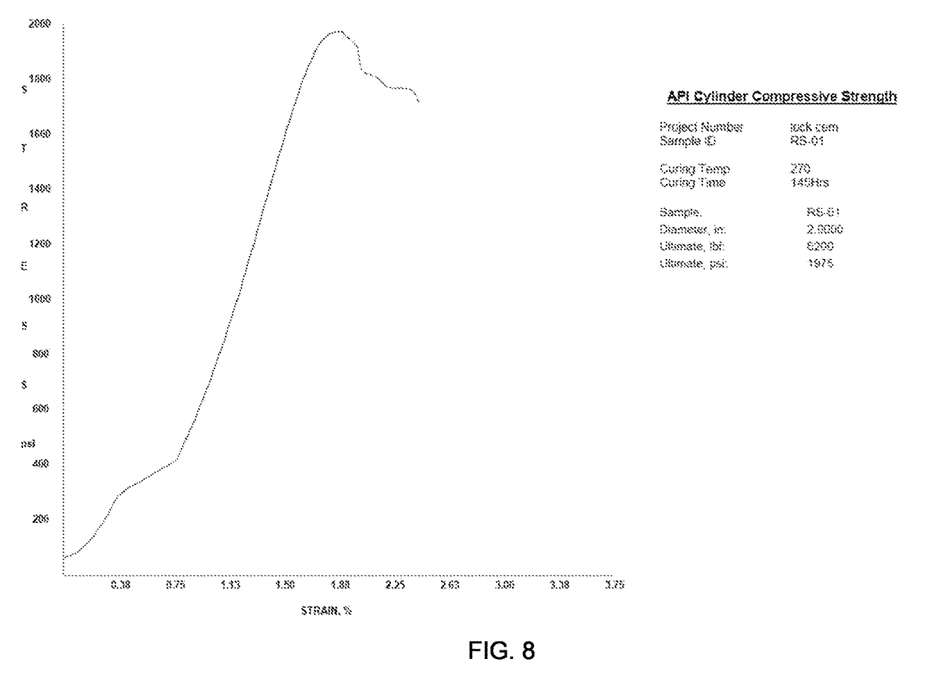
FIG. 8 is graph of a compressive strength analysis test of a resin cement slurry.

Slurry 1 with GPTMS and TMSPED was cured in an ultrasonic cement analyzer (UCA) for 7 days at 270° F. (132.2° C.). The results of the UCA test are shown in FIG. 7 and a crush test is shown in FIG. 8. It was observed that the compressive strength did not decrease during the test as shown in FIG. 7. Further, the ultimate compressive strength remained high as shown in FIG. 8. From FIG. 7 and FIG. 8, it was observed that the reaction between GPTMS and TMSPED with silicates is effective to prevent compressive strength retrogression at elevated temperatures.

The following statements may describe certain embodiments of the disclosure but should be read to be limiting to any particular embodiment.

Statement 1. A method comprising: introducing a silane based aqueous soluble resin into a wellbore, wherein the silane based aqueous soluble resin comprises a glycidyl alkoxy silane containing resin and an amino alkoxy silane hardener.

Statement 2. The method of statement 1 wherein the silane based aqueous soluble resin comprises 3-glycidoxypropyl trimethoxy silane and n-(3-(trimethoxysilyl)propyl) ethylenediamine.

Statement 3. The method of any of statements 1-2 wherein the silane based aqueous soluble resin comprises at least one glycidyl alkoxy silane resin selected from the group consisting of 3-glycidoxypropyl trimethoxy silane, (3 glycidoxypropyl)triethoxysilane, (3 glycidoxypropyl)methyldiethoxysilane, (3 glycidoxypropyl)methyldimethoxysilane, (3 glycidoxypropyl)dimethylethoxysilane (3 glycidoxypropyl)dimethylmethoxysilane, and combinations thereof.

Statement 4. The method of any of statements 1-3 wherein the silane based aqueous soluble resin comprises at least one amino alkoxy silane hardener selected from the group consisting of n-(3-(trimethoxysilyl)propyl)ethylenediamine, 3 aminopropyltriethoxysilane, 3 aminopropyltrimethoxysilane, 4 aminobutyltriethoxysilane, 3 (triethoxysilyl)propyl ethylenediamine, and combinations thereof.

Statement 5. The method of any of statements 1-4, further comprising: preparing a resin containing cement composition comprising a hydraulic cement, water, and the silane based aqueous soluble resin; and introducing the resin containing cement composition into the wellbore.

Statement 6. The method of any of statements 1-5, wherein the hydraulic cement comprises at least one selected from the group consisting of Portland cements, pozzolana cements, gypsum cements, high-alumina-content cements, slag cements, silica cements, and combinations thereof.

Statement 7. The method of any of statements 1-6, wherein the resin containing cement composition further comprises a resin selected from the group consisting of an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and a hybrid and copolymer thereof, a polyurethane resin and a hybrid and copolymer thereof, an acrylate resin, and combinations thereof.

Statement 8. The method of any of statements 1-7, wherein the resin containing cement composition further comprises a hardening agent selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

Statement 9. The method of any of statements 1-8, wherein the resin containing cement composition further comprises a diluent is selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d-limonene, fatty acid methyl esters, and any combinations thereof.

Statement 10. The method of any of statements 1-9, wherein the resin containing cement composition comprises about 5% to about 20% by volume of the silane based aqueous soluble resin.

Statement 11. A method comprising: preparing a resin containing cement composition comprising: cement; water; and introducing a silane based aqueous soluble resin into a wellbore, wherein the silane based aqueous soluble resin comprises a glycidyl alkoxy silane containing resin and an amino alkoxy silane hardener; and introducing the resin containing cement composition into a wellbore.

Statement 12. The method of statement 11, wherein the silane based aqueous soluble resin comprises at least one glycidyl alkoxy silane resin selected from the group consisting of 3-glycidoxypropyl trimethoxy silane, (3 glycidoxypropyl)triethoxysilane, (3 glycidoxypropyl)methyldiethoxysilane, (3 glycidoxypropyl)methyldimethoxysilane, (3 glycidoxypropyl)dimethylethoxysilane (3 glycidoxypropyl)dimethylmethoxysilane, and combinations thereof.

Statement 13. The method of any of statements 11-12, wherein the silane based aqueous soluble resin comprises at least one amino alkoxy silane hardener selected from the group consisting of n-(3-(trimethoxysilyl)propyl)ethylenediamine, 3 aminopropyltriethoxysilane, 3 aminopropyltrimethoxysilane, 4 aminobutyltriethoxysilane, 3 (triethoxysilyl)propyl ethylenediamine, and combinations thereof.

Statement 14. The method of any of statements 11-13, wherein the silane based aqueous soluble resin has a glass transition temperature of greater than 230° F. (110° C.).

Statement 15. The method of any of statements 11-14, wherein at least a portion of silane based aqueous soluble resin is allowed to enter into and harden in a perforation in a cement sheath within the wellbore.

Statement 16. The method of any of statements 11-15, wherein silane based aqueous soluble resin is used in primary cementing.

Statement 17. A cementing composition comprising: hydraulic cement; water; and a silane based aqueous soluble resin comprising 3-glycidoxypropyl trimethoxy silane and n-(3-(trimethoxysilyl)propyl)ethylenediamine.

Statement 18. The composition of statement 17, wherein the composition comprises about 5% to about 20% by volume of the silane based aqueous soluble resin.

Statement 19. The composition of statements 17-18 wherein the silane based aqueous soluble resin comprises at least one glycidyl alkoxy silane resin selected from the group consisting of 3-glycidoxypropyl trimethoxy silane, (3 glycidoxypropyl)triethoxysilane, (3 glycidoxypropyl)methyldiethoxysilane, (3 glycidoxypropyl)methyldimethoxysilane, (3 glycidoxypropyl)dimethylethoxysilane (3 glycidoxypropyl)dimethylmethoxysilane, and combinations thereof.

Statement 20. The composition of statements 17-19 wherein the silane based aqueous soluble resin comprises at least one amino alkoxy silane hardener selected from the group consisting of n-(3-(trimethoxysilyl)propyl)ethylenediamine, 3 aminopropyltriethoxysilane, 3 aminopropyltrimethoxysilane, 4 aminobutyltriethoxysilane, 3 (triethoxysilyl)propyl ethylenediamine, and combinations thereof.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:
1. A method comprising:
preparing a resin containing cement composition comprising:
cement;
water;

defoamer; and a silane based aqueous soluble resin, wherein the silane based aqueous soluble resin comprises a glycidyl alkoxy silane resin comprising 3-glycidoxypropyl trimethoxy silane and an amino alkoxy silane hardener comprising n-(3-(trimethoxysilyl)propyl)ethylenediamine, wherein the 3-glycidoxypropyl trimethoxy silane and the n-(3-(trimethoxysilyl)propyl)ethylenediamine represents at least 10% by volume of the resin containing cement composition, wherein the resin is in an amount of about 21% to about 40% by volume of the silane based aqueous soluble resin, wherein the silane based aqueous soluble resin has a glass transition temperature of greater than 230° F. (110° C.); and introducing the resin containing cement composition into a wellbore.

2. The method of claim 1, wherein the silane based aqueous soluble resin further comprises at least one glycidyl alkoxy silane resin selected from the group consisting of (3-glycidoxypropyl)triethoxysilane, (3-glycidoxypropyl)methyldiethoxysilane, (3-glycidoxypropyl)methyldimethoxysilane, (3-glycidoxypropyl)dimethylethoxysilane, (3-glycidoxypropyl)dimethylmethoxysilane, and combinations thereof.

3. The method of claim 1, wherein the silane based aqueous soluble resin further comprises at least one amino alkoxy silane hardener selected from the group consisting of 3-aminopropyltriethoxysilane, 3-aminopropyltrimethoxysilane, 4-aminobutyltriethoxysilane, 3-(triethoxysilyl)propyl ethylenediamine, and combinations thereof.

4. The method of claim 1, wherein at least a portion of silane based aqueous soluble resin is allowed to enter into and harden in a perforation in a cement sheath within the wellbore.

5. The method of claim 1, wherein silane based aqueous soluble resin is used in primary cementing.

6. A method comprising:

preparing a resin containing cement composition comprising a hydraulic cement, water, a defoamer, and a silane based aqueous soluble resin, wherein the silane based aqueous soluble resin comprises a glycidyl alkoxy silane resin comprising 3-glycidoxypropyl trimethoxy silane and an amino alkoxy silane hardener comprising n-(3-(trimethoxysilyl)propyl)ethylenediamine, wherein the 3-glycidoxypropyl trimethoxy silane and the n-(3-(trimethoxysilyl)propyl)ethylenediamine represents at least 10% by volume of the resin containing cement composition, wherein the resin is in an amount of about 21% to about 40% by volume of the silane based aqueous soluble resin, wherein the silane based aqueous soluble resin has a glass transition temperature of greater than 230° F. (110° C.); and introducing the resin containing cement composition into a wellbore.

7. The method of claim 6, wherein the hydraulic cement comprises at least one selected from the group consisting of Portland cements, pozzolana cements, gypsum cements, high-alumina-content cements, slag cements, silica cements, and combinations thereof.

8. The method of claim 6, wherein the resin containing cement composition further comprises a resin selected from the group consisting of an epoxy-based resin, a novolac resin, a polyepoxide resin, a phenol-aldehyde resin, a urea-aldehyde resin, a urethane resin, a phenolic resin, a furan/furfuryl alcohol resin, a phenolic/latex resin, a phenol formaldehyde resin, a bisphenol A diglycidyl ether resin, a butoxymethyl butyl glycidyl ether resin, a bisphenol A-epichlorohydrin resin, a bisphenol F resin, a glycidyl ether resin, a polyester resin and copolymer thereof, a polyurethane resin and copolymer thereof, an acrylate resin, and combinations thereof.

9. The method of claim 6, wherein the resin containing cement composition further comprises a hardening agent selected from the group consisting of an aliphatic amine, an aliphatic tertiary amine, an aromatic amine, a cycloaliphatic amine, a heterocyclic amine, an amido amine, a polyamide, a polyethyl amine, a polyether amine, a polyoxyalkylene amine, a carboxylic anhydride, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof.

10. The method of claim 6, wherein the resin containing cement composition further comprises a diluent is selected from the group consisting of butyl glycidyl ether, cyclohexane dimethanol diglycidyl ether, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d-limonene, fatty acid methyl esters, and any combinations thereof.

11. The method of claim 6, wherein the resin containing cement composition comprises about 5% to about 20% by volume of the silane based aqueous soluble resin.

12. The method of claim 6, wherein the silane based aqueous soluble resin comprises at least one glycidyl alkoxy silane resin selected from the group consisting of 3-glycidoxypropyl trimethoxy silane, (3-glycidoxypropyl)triethoxysilane, (3-glycidoxypropyl)methyldiethoxysilane, (3-glycidoxypropyl)methyldimethoxysilane, (3-glycidoxypropyl)dimethylethoxysilane, (3-glycidoxypropyl)dimethylmethoxysilane, and combinations thereof.

13. A method comprising:

preparing a resin containing cement composition comprising a hydraulic cement, water, a defoamer, and a silane based aqueous soluble resin, wherein the silane based aqueous soluble resin comprises a glycidyl alkoxy silane resin comprising 3-glycidoxypropyl trimethoxy silane and an amino alkoxy silane hardener comprising n-(3-(trimethoxysilyl)propyl)ethylenediamine, wherein the 3-glycidoxypropyl trimethoxy silane and the n-(3-(trimethoxysilyl)propyl)ethylenediamine represents at least 10% by volume of the resin containing cement composition, wherein the resin is in an amount of about 21% to about 40% by volume of the silane based aqueous soluble resin, wherein the silane based aqueous soluble resin has a glass transition temperature of greater than 230° F. (110° C.); and introducing the resin containing cement composition into a wellbore, wherein the silane based aqueous soluble resin further comprises at least one amino alkoxy silane hardener selected from the group consisting of 3-aminopropyltriethoxysilane, 3-aminopropyltrimethoxysilane, 4-aminobutyltriethoxysilane, 3-(triethoxysilyl)propyl ethylenediamine, and combinations thereof.

* * * * *